(12) United States Patent
Matsuda et al.

(10) Patent No.: US 6,519,303 B1
(45) Date of Patent: Feb. 11, 2003

(54) CLOCK REPRODUCTION CIRCUIT

(75) Inventors: Shoji Matsuda, Kawasaki (JP);
Kenichi Shiraishi, Yokohama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/890,865

(22) PCT Filed: Feb. 7, 2000

(86) PCT No.: PCT/JP00/00654
§ 371 (c)(1),
(2), (4) Date: Aug. 7, 2001

(87) PCT Pub. No.: WO00/48371
PCT Pub. Date: Aug. 17, 2000

(30) Foreign Application Priority Data

Feb. 12, 1999 (JP) .......................................... 11-033657

(51) Int. Cl.[7] .............................................. H04L 7/00
(52) U.S. Cl. ........................................ 375/355; 327/291
(58) Field of Search ................................. 375/355, 375, 375/391, 326; 329/304; 327/291, 141

(56) References Cited

U.S. PATENT DOCUMENTS

| 3,878,475 A | * | 4/1975 | Okano et al. ................. 331/12 |
| 5,105,447 A | * | 4/1992 | Iwane ........................ 375/360 |
| 5,448,201 A | * | 9/1995 | Kawabata .................... 329/304 |
| 5,703,914 A | * | 12/1997 | Nakamura .................... 375/355 |
| 6,169,768 B1 | * | 1/2001 | Okada et al. ................ 375/316 |
| 6,314,074 B1 | * | 11/2001 | Kuribayasi ............... 369/124.05 |

FOREIGN PATENT DOCUMENTS

| JP | 06-252967 | 9/1994 |
| JP | 08-331191 | 12/1996 |
| JP | 9-166624 | * 9/1997 | ........... G01R/13/32 |

OTHER PUBLICATIONS

International Search Report dated May 16, 2000.

* cited by examiner

*Primary Examiner*—Jean Corrielus
(74) *Attorney, Agent, or Firm*—Eric J. Robinson; Robinson Intellectual Property Law Office, P.C.

(57) ABSTRACT

A clock reproducing circuit for reproducing a clock signal accurately from a PSK modulated signal so as to sample the I's aperture point. The phase of the PSK modulated signal is rotated by a phase rotation circuit (1) by a predetermined angle according to the transition angle between adjoining reception points, and the phase difference due to the time difference between the zero cross point position at which the adjoining reception points of the phase-rotated PSK modulated signal intersect the I-axis or the Q-axis and the time center position of the adjoining reception points is detected by a phase difference detecting circuit (2). According to the phase difference detected, the oscillation frequency of a voltage-controlled oscillator (5) is controlled to accurately reproduce the clock to be sampled at the I aperture.

3 Claims, 11 Drawing Sheets

| CASE | CARRIER REPRODUCTION FLAG | DE-MAPPING DATA | DISTANCE BETWEEN DE-MAPPING DATA | PHASE DIFFERENCE | S45 | S22.5 | ROTATION ANGLE OF I',Q' |
|---|---|---|---|---|---|---|---|
|  | 0 | × | × | × | 0 | 0 | 0° |
|  | 1 | × | 0 | 0° | 0 | 0 | 0° |
| a | 1 | 0,1 OR 2,3 OR 4,5 OR 6,7 | 1 | 45° | 0 | 1 | −22.5° |
| b | 1 | 1,2 OR 3,4 OR 5,6 OR 7,0 | 1 | 45° | 1 | 1 | −67.5° |
| c | 1 | 1,3 OR 3,5 OR 5,7 OR 7,1 | 2 | 90° | 0 | 0 | 0° |
| d | 1 | 0,2 OR 2,4 OR 4,6 OR 6,0 | 2 | 90° | 1 | 0 | −45° |
| e | 1 | 1,4 OR 3,6 OR 5,0 OR 7,2 | 3 | 135° | 0 | 1 | −22.5° |
| f | 1 | 0,3 OR 2,5 OR 4,7 OR 6,1 | 3 | 135° | 1 | 1 | −67.5° |
| g | 1 | 1,5 OR 3,7 | 4 | 180° | 0 | 0 | 0° |
| h | 1 | 0,4 OR 2,6 | 4 | 180° | 1 | 0 | −45° |

CLOCK REPRODUCTION CIRCUIT

This is a 371 of PCT/JP00/00654, filed on Feb. 7, 2000.

TECHNICAL FIELD

The present invention relates to a clock recovery circuit for reproducing a sampling clock signal from a PSK demodulated signal to sample the PSK demodulated signal at its eye aperture point.

BACKGROUND ART

A prior clock recovery method which reproduces a sampling clock signal from a PSK demodulated signal through a zero cross technique has been known. It should be appreciated that a zero cross point refers to a point where adjoining reception points of the PSK demodulated signal intersect an I-axis or a Q-axis.

Figure 9:
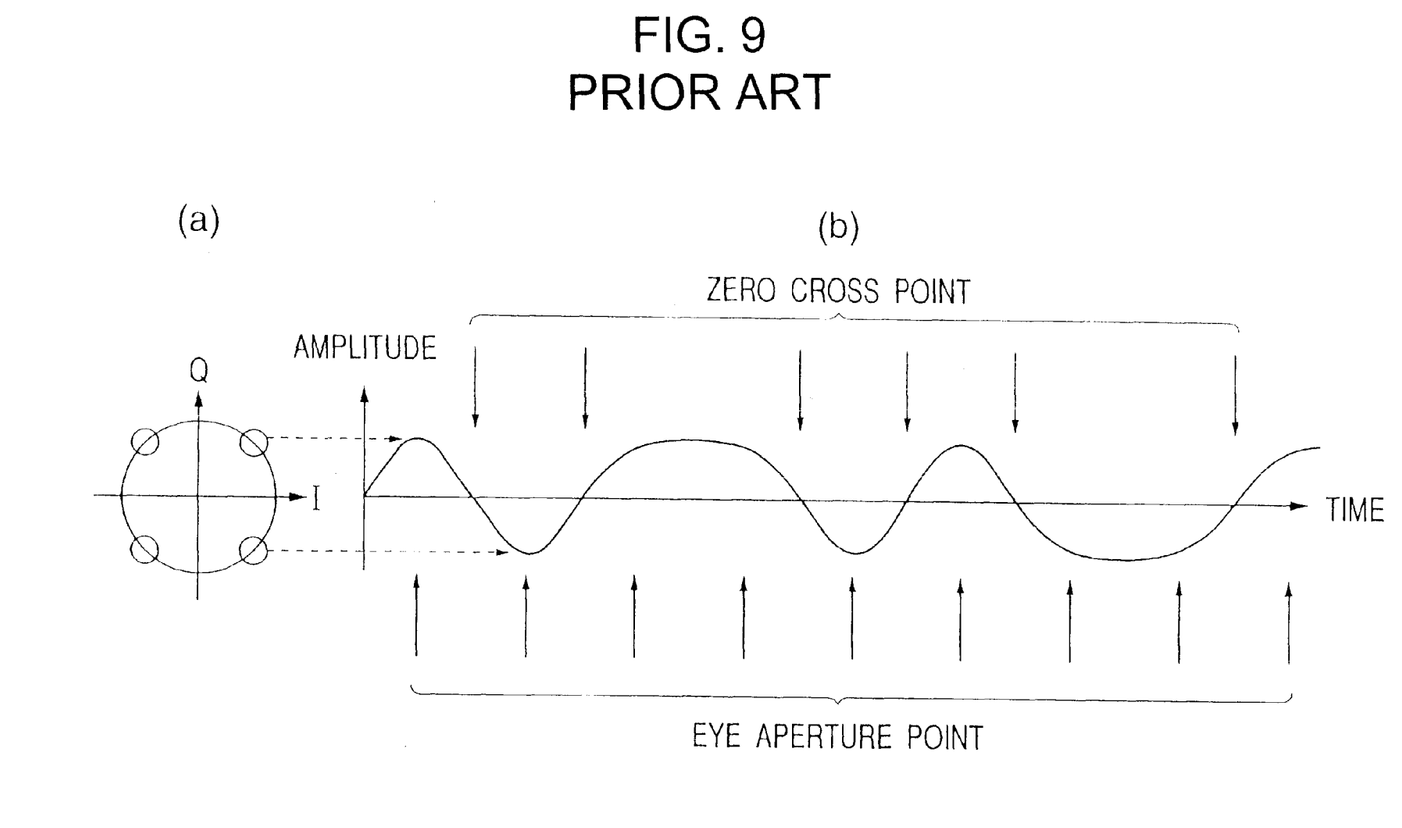
FIG. 9 is a schematic drawing for explaining a zero cross technique used for a prior clock recovery method.

The PSK demodulated signal is limited in band by filtering or any other technique and in particular, a QPSK demodulated signal has a constellation as shown in FIG. 9(*a*) and a dull waveform as shown in FIG. 9(*b*). To obtain correct mapping information from the PSK demodulated signal with such a dull waveform, there exists the need for reproducing a clock signal to sample the PSK demodulated signal at a point called an eye aperture point.

A timing for this sampling is determined through the zero cross technique which uses a point where adjoining reception points of the PSK demodulated signal intersect the I-axis or the Q-axis. Namely, the eye aperture point is determined based on the zero cross point. This is due to the fact that there exists a point where the amplitude of the PSK demodulated signal is zero, that is, where the PSK demodulated signal intersects the I-axis or the Q-axis.

Figure 10:
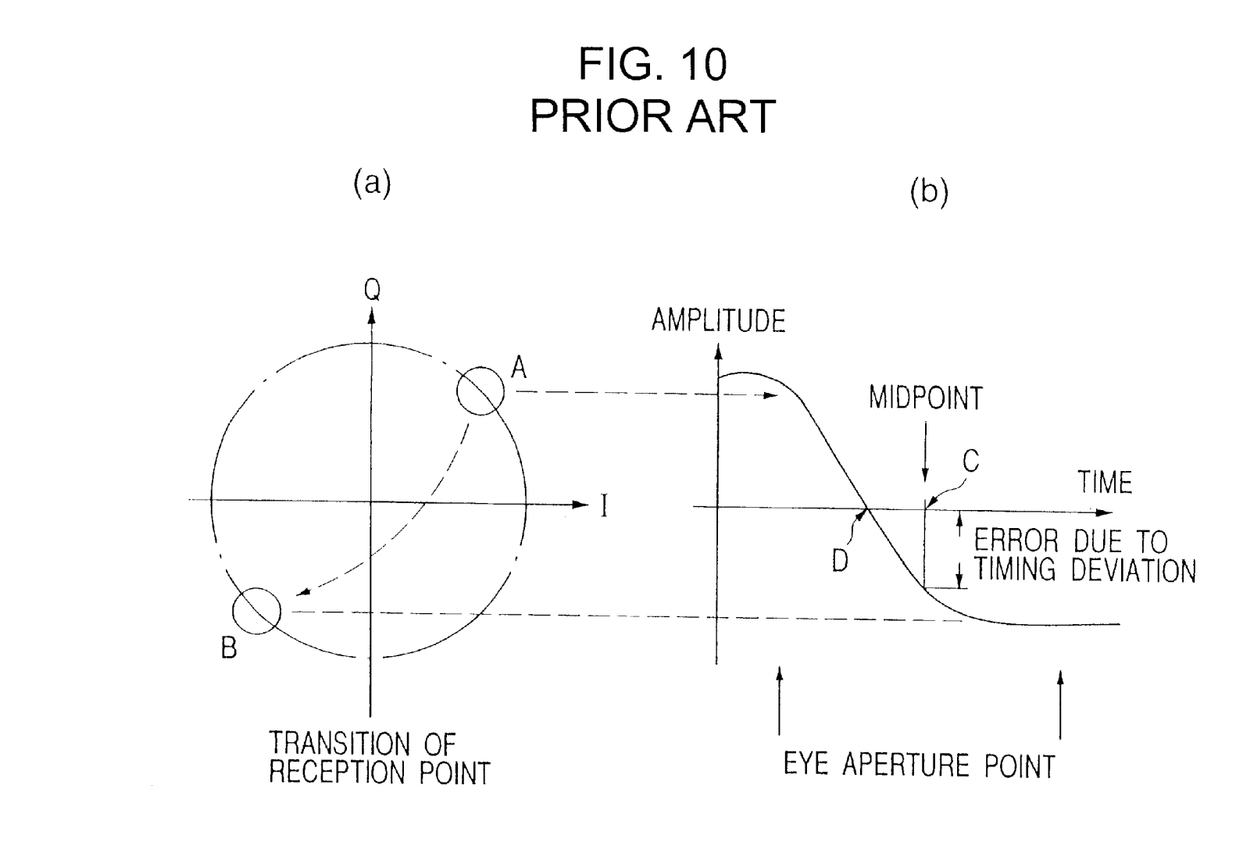
FIG. 10 is a schematic drawing for explaining the zero cross technique used for the prior clock recovery method.

For example, if a reception point transits from the point A to the point B as shown in FIG. 10(*a*), there may exist a slight deviation in time between the midpoint C in time for eye aperture points and the zero cross point D as shown in FIG. 10(*b*). A clock signal can be extracted from a received signal by detecting this deviation and correcting the sampling timing in a direction to eliminate this deviation. This is the clock recovery method through an ordinary zero cross technique.

It should be appreciated that a QPSK demodulated signal with no reception point on the I-axis or the Q-axis is defined to have its adjoining reception points intersect the I-axis or the Q-axis. Therefore, for the QPSK demodulated signal, even if a zero cross point deviates from the midpoint in time for eye aperture points, a correct timing deviation could be calculated.

Figure 11:
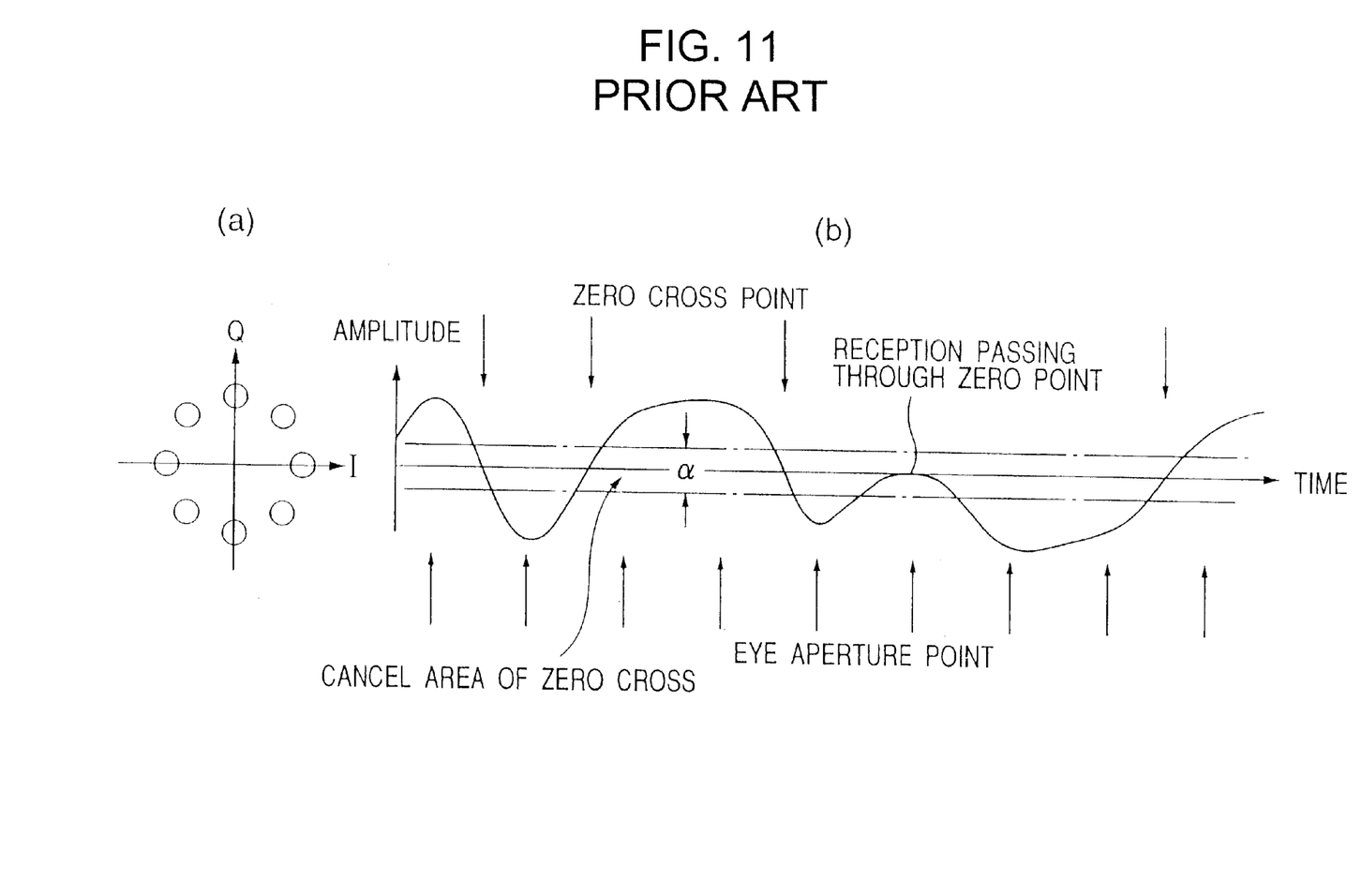
FIG. 11 is a schematic drawing for explaining the zero cross technique used for the prior clock recovery method.

However, since an 8PSK demodulated signal has its reception points on the I-axis or the Q-axis as shown in the constellation of FIG. 11(*a*) and the waveform of FIG. 11(*b*), a point which is not an actual zero cross point may be detected as a zero cross point, that is, an intersection point on the I-axis may be wrongly recognized as a zero cross point, for example, when a reception point on the I-axis follows a reception point in the third quadrant and the reception point on the I-axis deviates in the positive direction of the Q-axis from some reason.

Thus, in the prior clock signal reproduction method, reception points during the interval α as shown in FIG. 11(*b*) are not used for zero cross detection and are cancelled so that reception points demodulated in the proximity of the I-axis or the Q-axis can be recognized as those on the axis to avoid any significant error in detecting zero cross points and to allow for sampling at eye aperture points of the 8PSK demodulated signal.

Figure 12:
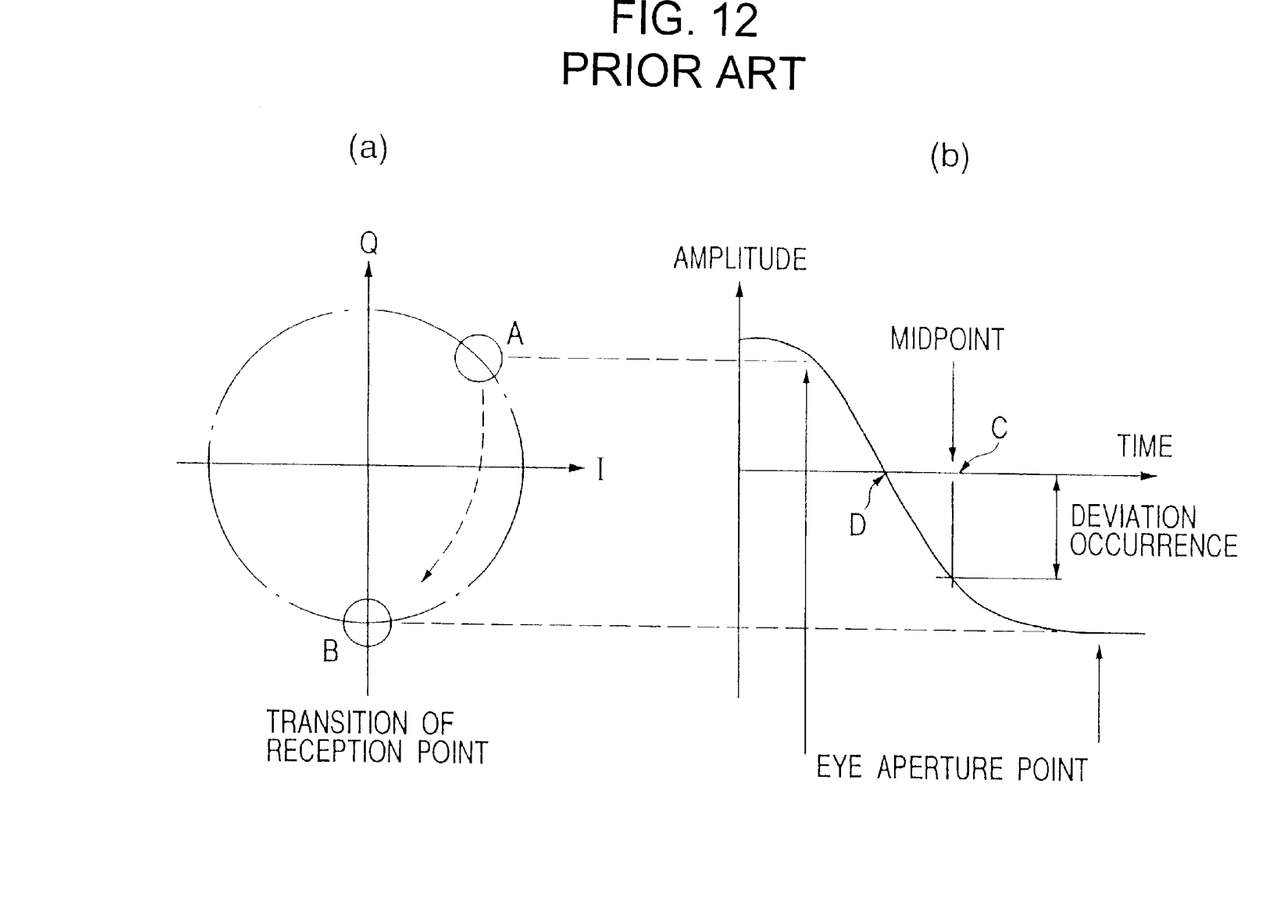
FIG. 12 is a schematic drawing for explaining the zero cross technique used for the prior clock recovery method.

However, a prior clock recovery circuit cannot ensure accurate detection of zero cross points because it does not determine whether a point of interest is a reception point in the proximity of the I-axis or the Q-axis. In addition, the 8PSK demodulated signal has a maximum value, a minimum value, and a value on the I-axis, as well as a midpoint value, and thus, if a reception point transits from the point A to the point B as shown in the constellation of FIG. 12(*a*), the midpoint C in time for adjoining eye aperture points may deviate from a detected zero cross point D as shown in FIG. 12(*b*) and there may exist a phase error due to a deviation between the midpoint C and the zero cross point D.

Furthermore, in the prior circuit, zero cross detection is performed by using an absolute phase technique which allows a signal at the receiver to be in phase with a signal at the transmitter and thus, a reception point may exist on the axis and fewer zero cross points can be detected.

It is an object of the present invention to provide a clock recovery circuit which can reproduce a clock signal accurately from a PSK demodulated signal in order to sample an eye aperture point.

DISCLOSURE OF THE INVENTION

A clock recovery circuit according to the present invention includes: a phase rotation circuit for phase-rotating a PSK demodulated signal by an angle predetermined from a transition angle between adjoining reception points; and a phase error detection circuit for detecting a phase error due to a time difference between a zero cross point where the adjoining reception points of the PSK demodulated signal phase-rotated by the phase rotation circuit intersect the I-axis or the Q-axis and the midpoint in time for the adjoining reception points, so that a sampling location for the adjoining reception points of the PSK demodulated signal is corrected based on the phase error detected by the phase error detection circuit in order to allow for sampling at an eye aperture point.

With the clock recovery circuit according to the present invention, the PSK demodulated signal is phase-rotated by the phase rotation circuit by the angle predetermined from the transition angle between adjoining reception points and the phase error due to the time difference between the zero cross point where the adjoining reception points of the PSK demodulated signal phase-rotated by the phase rotation circuit intersect the I-axis or the Q-axis and the midpoint in time for the adjoining reception points is detected by the phase error detection circuit, so that the sampling location for the adjoining reception points of the PSK demodulated signal is corrected based on the phase error detected by the phase error detection circuit in order to allow for sampling at an eye aperture point.

Accordingly, a sampling point obtained based on a clock reproduced by the clock recovery circuit according to the present invention can coincide with the eye aperture point to allow for sampling at the eye aperture point.

DESCRIPTION OF THE EMBODIMENTS

Now, a clock recovery circuit according to the present invention will be described with reference to embodiments thereof in the following.

Figure 1:
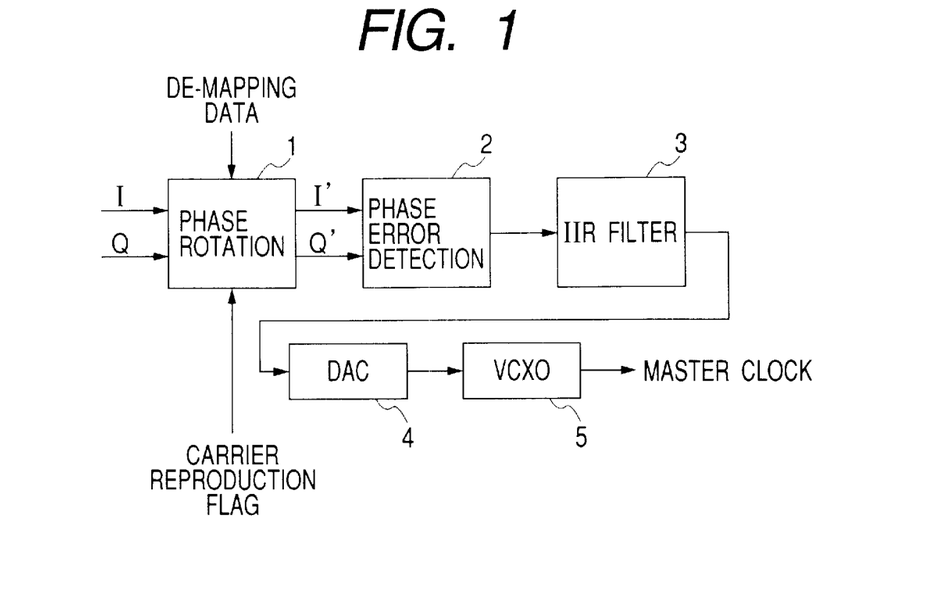
FIG. 1 is a block diagram for showing a configuration of a clock recovery circuit according to an embodiment of the present invention.

FIG. 1 is a block diagram for showing a configuration of a clock recovery circuit according to an embodiment of the present invention. By way of example, the clock recovery circuit according to an embodiment of the present invention will be described below for an 8PSK demodulated signal.

In the clock recovery circuit according to an embodiment of the present invention, as shown in FIG. 1, a PSK demodulated signal (I', Q') is supplied to a phase rotation circuit 1 and is phase-rotated there by a phase angle predetermined from a carrier reproduction flag, de-mapping data, and a transition angle between adjoining reception points, and thus, a phase-rotated PSK demodulated signal (I', Q') is supplied by the phase rotation circuit 1.

The PSK demodulated signal (I', Q') from the phase rotation circuit 1 is supplied to a phase error detection circuit 2 to detect a phase error due to a time difference between a zero cross point based on the adjoining reception points of the PSK demodulated signal (I', Q') and the midpoint in time for the reception points. The phase error detected by the phase error detection circuit 2 is supplied to a low-pass IIR filter 3 to extract a low frequency component of the phase error and then the output of the low-pass IIR filter 3 is supplied to a D/A converter 4 to convert it to an analog signal of a level determined from the low frequency component of the phase error, and finally, the converted analog signal is supplied to a temperature-compensating voltage-controlled crystal oscillator as a frequency control signal to obtain a master clock signal. A sampling clock is obtained from this master clock signal, for example, by dividing the master clock signal.

Thus, based on the master clock signal, a sampling is performed at an eye aperture point of the PSK demodulated signal. It should be appreciated that the configuration of the phase error detection circuit 2 and the subsequent stages is similar to that for the prior zero cross technique.

Next, the configuration will be described below in more detail.

Figure 2:
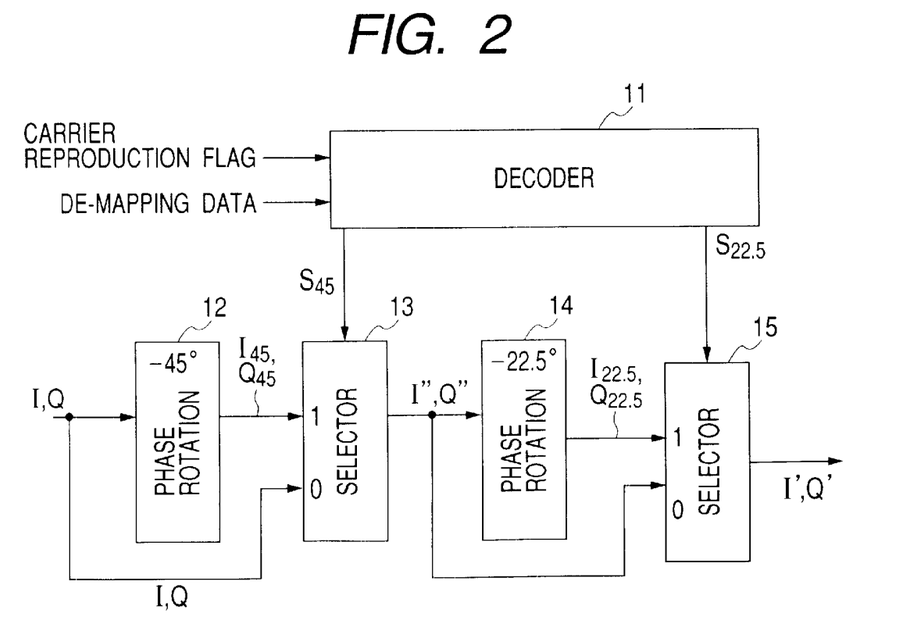
FIG. 2 is a block diagram for showing a configuration of a phase rotation circuit in the clock recovery circuit according to an embodiment of the present invention.

The phase rotation circuit 1 is described with reference to FIG. 2. The PSK demodulated signal (I, Q) is supplied to a phase rotator 12 to phase-rotate the PSK demodulated signal (I, Q) by −45°. The output from the phase rotator 12 is referred to as a PSK demodulated signal (I45, Q45). The PSK demodulated signal (I, Q) and the PSK demodulated signal (I45, Q45) are supplied to a selector 13, which selects either one of these signals based on a select signal S45 from a decoder 11 described later. The output from the selector 13 is referred to as a PSK demodulated signal (I", Q").

The PSK modulated signal (I", Q") is supplied to a phase rotator 14 to phase-rotate the PSK demodulated signal (I, Q) by −22.5°. The output from the phase rotator 14 is referred to as a PSK demodulated signal (I22.5, Q22.5). The PSK demodulated signal (I", Q") and the PSK demodulated signal (I22.5, Q22.5) are supplied to a selector 15, which selects either one of these signals based on a select signal S22.5 from the decoder 11 described later. The output from the selector 15 is referred to as a PSK demodulated signal (I', Q').

Thus, depending on the select signals S22.5 and S45, the PSK demodulated signal (I', Q') may be the PSK demodulated signal (I, Q) which has not been phase-rotated with respect to the PSK demodulated signal (I, Q), or the PSK demodulated signal (I22.5, Q22.5) which has been phase-rotated by −22.5°, or the PSK demodulated signal (I45, Q45) which has been phase-rotated by −45°, or the PSK demodulated signal (I67.5, Q67.5) which has been phase-rotated by −67.5°.

Figure 3:
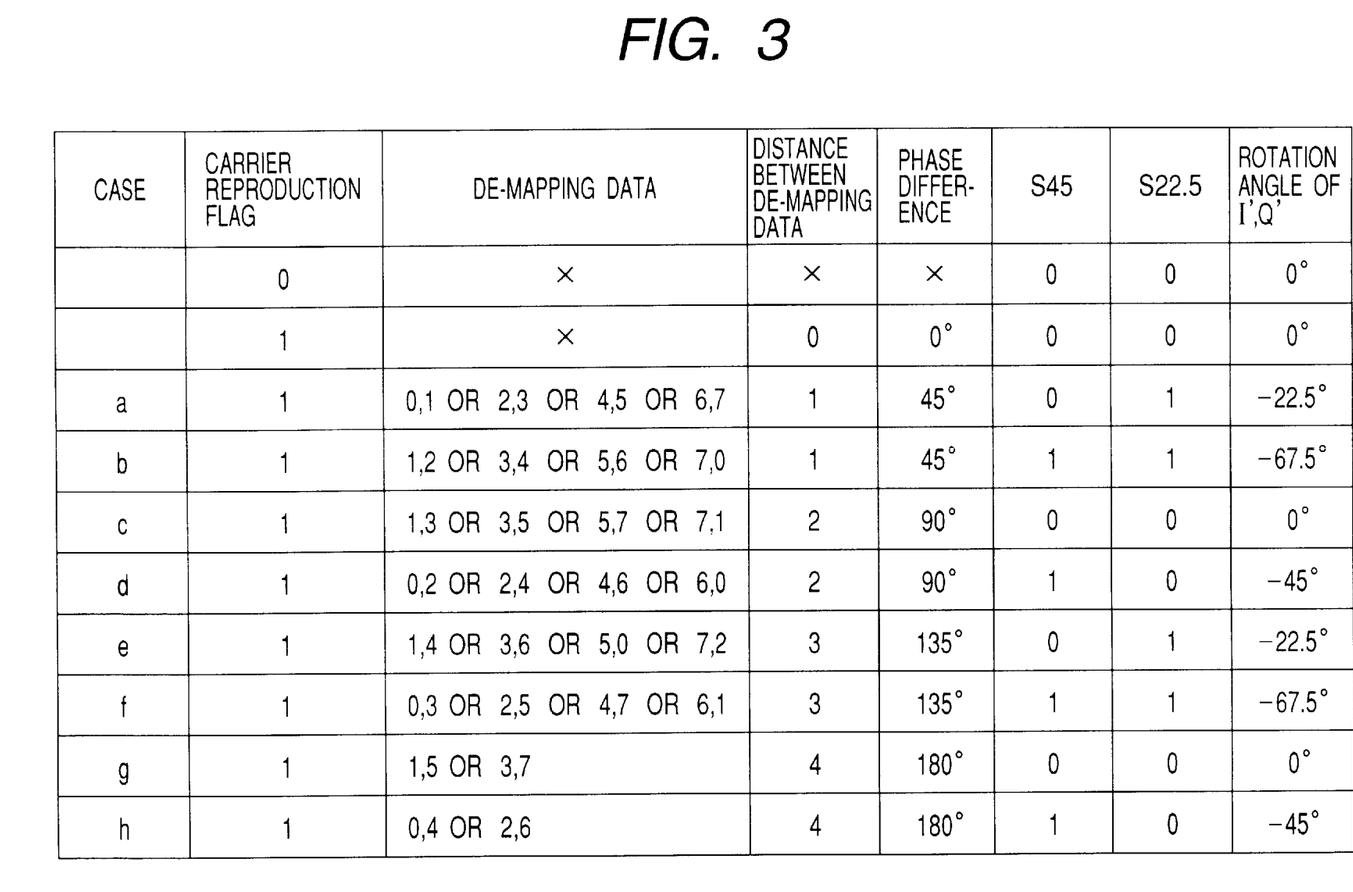
FIG. 3 is an explanatory drawing for showing truth values in a decoder for the phase rotation circuit shown in FIG. 2.

The decoder 11 receives a carrier reproduction flag and de-mapping data and sends out the select signals S45 and S22.5 to the selectors 13 and 15, respectively. FIG. 3 is a truth table for explaining the decoding operation in the decoder 11.

The carrier reproduction flag is at high potential while the carrier is reproduced. The de-mapping data is a numeric value (0) to (7) representing a reception phase of the PSK demodulated signal, assuming that the value 0 represents a positive point on the I-axis and it is incremented by 1 for 45° in a counterclockwise direction. Namely, the demapping data (0), (1), (2), (3), (4), (5), (6), and (7) correspond to 0, 45, 90, 135, 180, 225, and 270°, respectively.

Therefore, a difference between the de-mapping data and a phase difference are as shown in FIG. 3 for each case and the phase difference indicates a transition angle. A phase rotation angle by which the PSK demodulated signal (I, Q) is phase-rotated depending on the select signal S45 or S22.5 from the decoder 11 to produce the PSK demodulated signal (I', Q') is denoted as a rotation angle of (I', Q') in FIG. 3.

This truth table is further described with reference to specific 10 examples. For example, for the case e with the de-mapping data 1,4, the reception points are at 45 and 180°. In this case, the reception point at 45° transits to the point at 180° with a transition angle of 135°. If the reception point at 180° transits to the point at 45° the same transition results are obtained.

In this case, the PSK demodulated signal (I, Q) is rotated by the phase rotation circuit 1 by a rotation angle of −22.5°, which means that the signal is phase-rotated by 22.5° in a clockwise direction. This rotation causes the reception point at 45° to be rotated to the reception point at 22.5° and the reception point at 180° to be rotated to the reception point at 157.5°, resulting in no reception point on the I-axis and the Q-axis. This will hold true for any other reception point.

Figure 4:
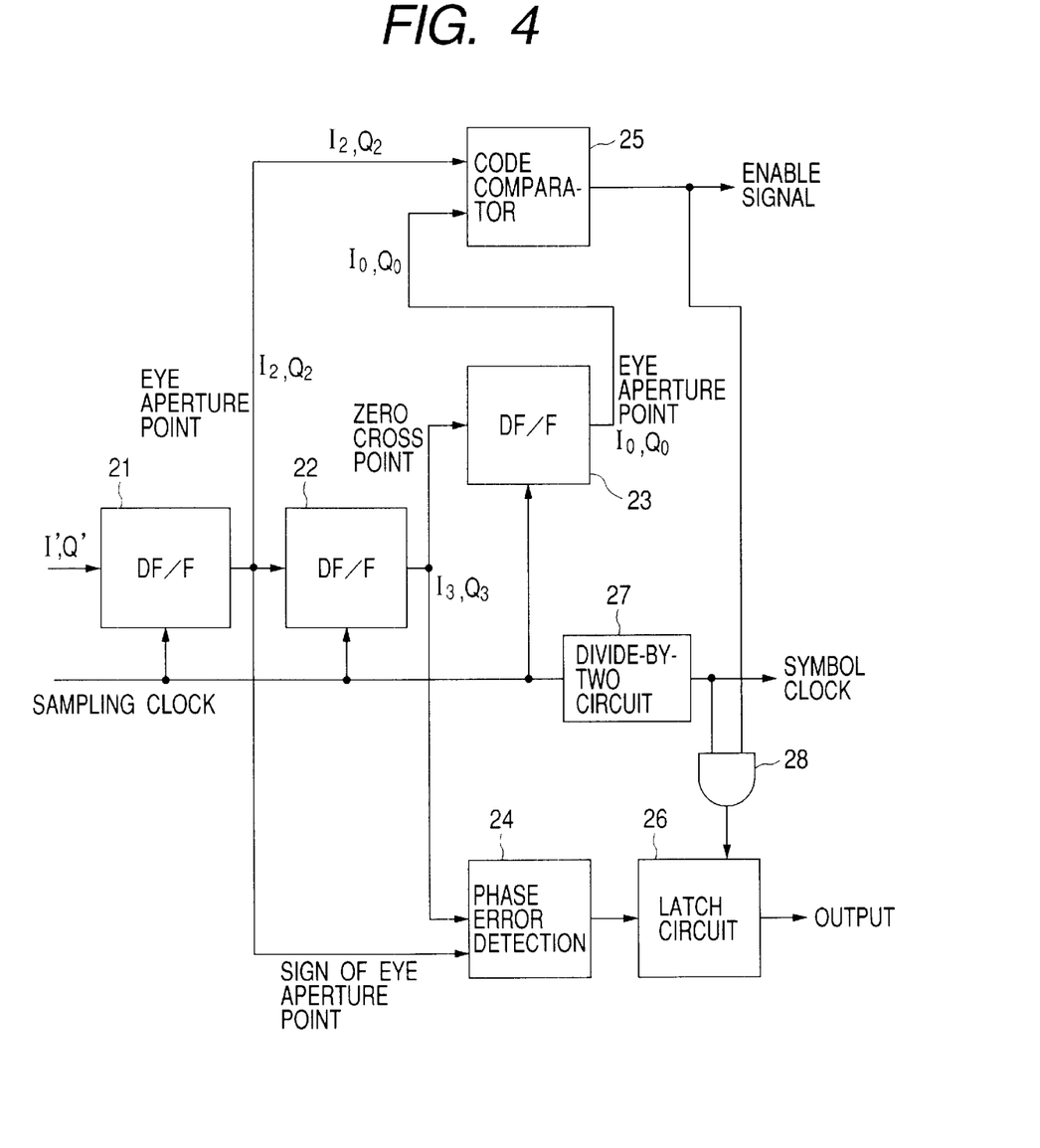
FIG. 4 is a block diagram for showing a configuration of a phase error detection circuit in the clock recovery circuit according to an embodiment of the present invention.

The PSK demodulated signal (I', Q') phase-rotated by the phase rotation circuit 1 as described above is supplied to the phase error detection circuit 2. An example of the phase error detection circuit 2 is shown in FIG. 4.

In the phase error detection circuit 2, the PSK demodulated signal (I', Q') is supplied to a D flip-flop (also referred to as DFF) 21, which reads out the PSK demodulated signal (I', Q') by means of a sampling clock at a frequency double that of a symbol clock. The output from the DFF 21 is referred to as a PSK demodulated signal (I2, Q2). The PSK demodulated signal (I2, Q2) is supplied to a DFF 22 and is read out by means of a sampling clock in a similar manner. The output from the DFF 22 is referred to as a PSK demodulated signal (I3, Q3). The PSK demodulated signal (I3, Q3) is supplied to a DFF 23 and is read out by means of a sampling clock in a similar manner. The output from the DFF 23 is referred to as a PSK demodulated signal (I0, Q0).

The PSK demodulated output (I2, Q2) and the PSK demodulated output (I0, Q0) are supplied to a code comparator 25, which compares the signs of these outputs. The code comparator 25 provides an enable signal when the sign of the PSK demodulated output (I2, Q2) is different from that of the PSK demodulated output (I0, Q0). On the other hand, a symbol clock divided from the sampling clock by a divide-by-two circuit 27 and the enable signal provided by the code comparator 25 are ANDed by an AND gate 28 and then by using the output of the AND gate 28 as a strobe pulse, phase error data provided by a phase error detector 24 which receives the PSK signal (I2, Q2) and the PSK demodulated signal (I3, Q3) is latched by a latch circuit 26.

The latch output from the latch circuit 26 is supplied to the temperature-compensating voltage-controlled crystal oscillator 5 to control the frequency of the sampling clock based on the oscillation frequency of the temperature-compensating voltage-controlled crystal oscillator 5 and thus, when the sampling clock is converged, a sampling timing to read out the PSK demodulated signal (I', Q') will be a sampling output at an eye aperture point and the PSK demodulated signal (I0, Q0) will be a sampling output of the PSK demodulated signal (I', Q') at an eye aperture point subsequent to the eye aperture point read out by the DFF 21.

Therefore, when converged as described above, the PSK demodulated signal (I3, Q3) is the PSK demodulated signal (I', Q') at the midpoint in time for the sampling outputs and their zero cross points coincide with each other. On the other hand, when not converged, the PSK demodulated signal (I3, Q3) corresponds to a distance between the PSK demodulated signal at the midpoint in time for adjoining reception points of the PSK demodulated signal and the I-axis or the Q-axis.

The phase error detector 24 receives the PSK demodulated signal (I2, Q2) and the PSK demodulated signal (I3, Q3) to produce a phase error which corresponds to the distance between the PSK demodulated signal at the midpoint in time for adjoining reception points of the PSK demodulated signal and the I-axis or the Q-axis. The direction of this phase error is determined from the sign of an eye aperture point based on the PSK demodulated signal (I2, Q2).

Therefore, as the output from the phase error detector 24, a time difference between the midpoint in time for eye aperture points and the zero cross point is determined along with its polarity. Thus, since the latch circuit 26 uses phase error data provided by the phase error detector 24 once per two adjoining sampling clocks, the PSK demodulated signal (I0, Q0) and the PSK demodulated signal (I2, Q2) are converged to an eye aperture point.

The output of the latch circuit 26 is supplied to the low-pass IIR filter and its low frequency component as a phase error is converted by the D/A converter to an analog signal and finally, the D/A converted analog signal is supplied to the temperature-compensating voltage-controlled crystal oscillator 5 as a frequency control signal to provide a master clock signal. Thus, the frequency of the master clock is controlled based on the phase error provided by the phase error detector 24 so that the midpoint between the eye aperture points is controlled to be at a zero cross point of the PSK demodulated signal (I', Q') based on this master clock and hence, a sampling will be performed at an eye aperture point.

The operation of the phase error detection circuit in the clock recovery circuit according to an embodiment of the present invention as described above will be further described with reference to FIGS. 5 to 8.

Figure 5:
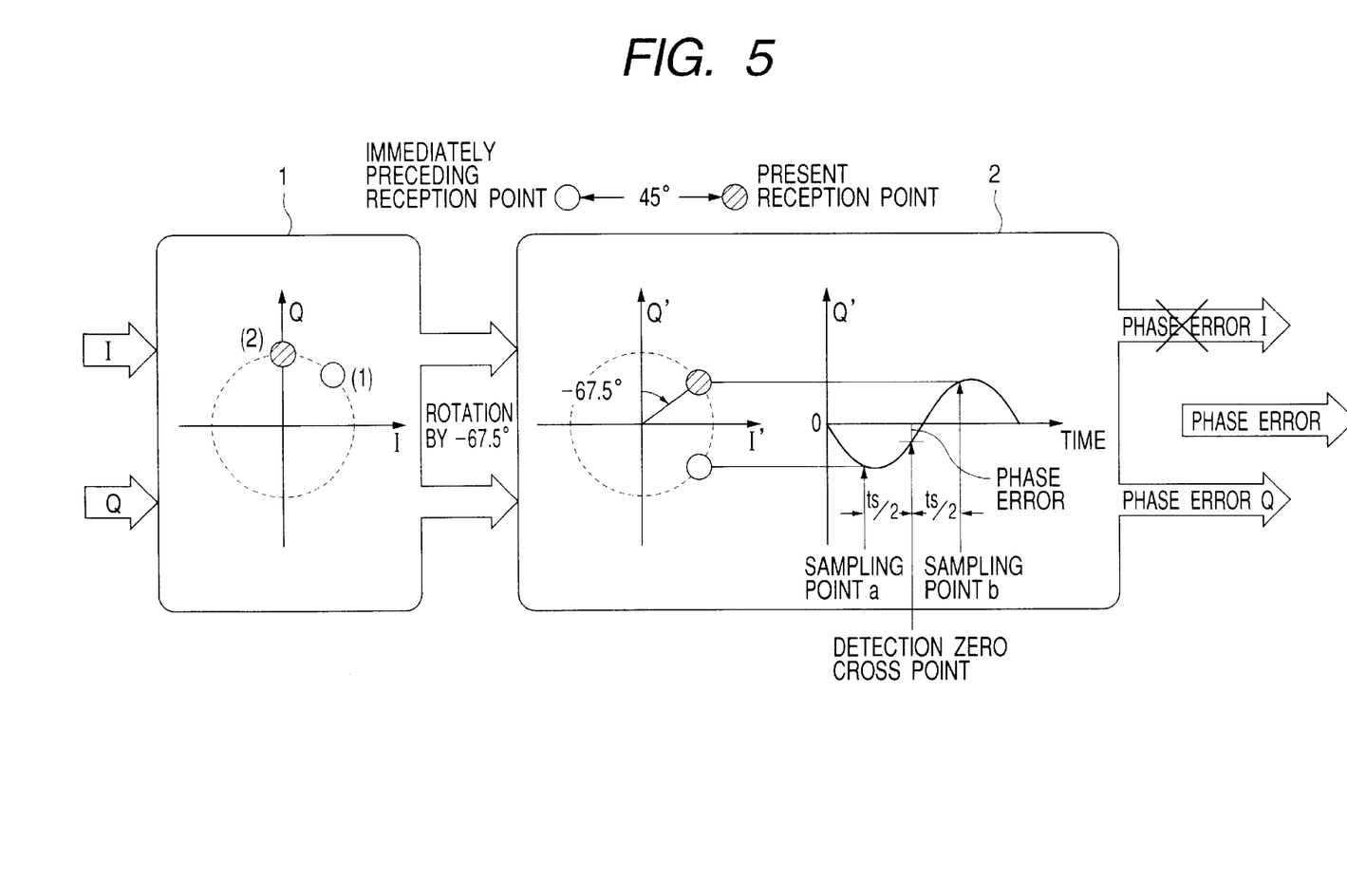
FIG. 5 is a schematic drawing for explaining an operation of the clock recovery circuit of the present invention according to an embodiment of the present invention.

When mapping data of the PSK demodulated signal (I, Q) is (1) and (2) shown in FIG. 5, this is the case b, wherein the transition angle between reception points is 45° and the PSK demodulated signal (I', Q') phase-rotated by the phase rotation circuit 1 by −67.5° is supplied to the phase error detection circuit 2. The PSK demodulated signal (I', Q') is sampled by the DFF 21 at a sampling point a, the PSK demodulated signal (I', Q') is sampled by the DFF 23 at a sampling point b, and the PSK demodulated signal (I', Q') is sampled by the DFF 22. The PSK demodulated signal (I', Q') sampled by the DFF 22 is located at the midpoint between the sampling point a and the sampling point b and is hereinafter referred to as a detection zero cross point. The term ts denotes the period of a sampling clock.

A distance between the detection zero cross point and the I-axis or the Q-axis is detected by the phase error detector 24 as a phase error and the frequency of the master clock is controlled based on this phase error so that, in the case of FIG. 5, the detection zero cross point is moved toward the right to coincide with the zero cross point. It should be appreciated that, in this case, the phase rotation causes no eye aperture point of the PSK demodulated signal (I', Q') to be located on the I-axis or the Q-axis. It should be further appreciated that, in this case, since the reception points before and after the transition are in the same polarity direction with respect to the I'-axis, no phase error is detected, which is shown by the symbol x on the phase error I in the figure.

Figure 6:
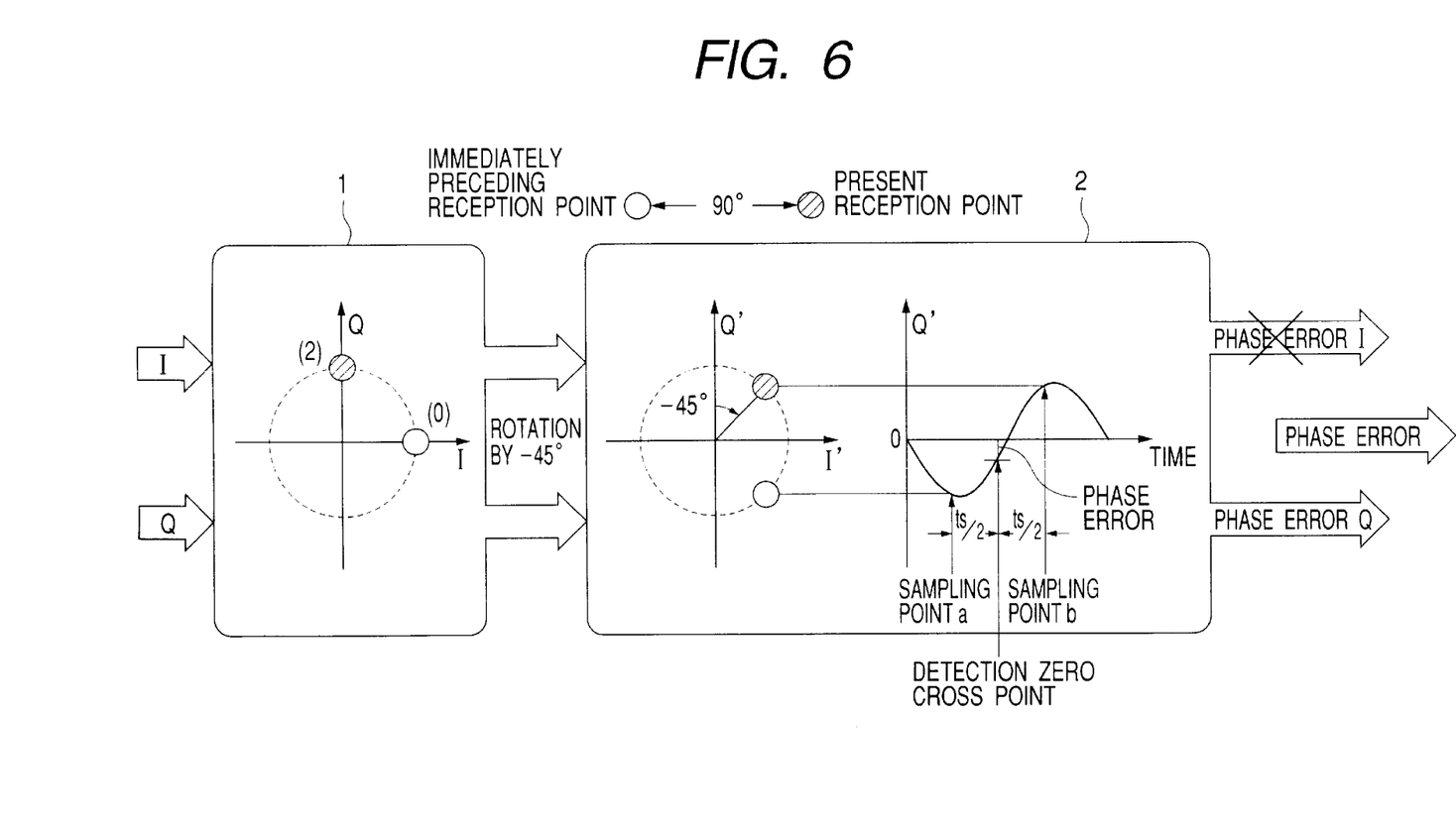
FIG. 6 is a schematic drawing for explaining the operation of the clock recovery circuit according to an embodiment of the present invention.

When mapping data of the PSK demodulated signal (I, Q) is (0) and (2) shown in FIG. 6, this is the case d, wherein the transition angle between reception points is 90° and the PSK demodulated signal (I', Q') phase-rotated by the phase rotation circuit 1 by −45° is supplied to the phase error detection circuit 2. The PSK demodulated signal (I', Q') is sampled by the DFF 21 at a sampling point a, the PSK demodulated signal ('I, Q') is sampled by the DFF 23 at a sampling point b, and the PSK demodulated signal (I', Q') is sampled by the DFF 22 at a detection zero cross point.

A distance between the detection zero cross point and the I-axis or the Q-axis is detected by the phase error detector 24 as a phase error and the frequency of the master clock is controlled based on this phase error so that, in the case of FIG. 6, the detection zero cross point is moved toward the right to coincide with the zero cross point. It should be appreciated that, in this case, the phase rotation causes no eye aperture point of the PSK demodulated signal (I', Q') to be located on the I-axis or the Q-axis. It should be further appreciated that, in this case, since the reception points before and after the transition are in the same polarity direction with respect to the I'-axis, no phase error is detected, which is shown by the symbol x on the phase error I in the figure.

Figure 7:
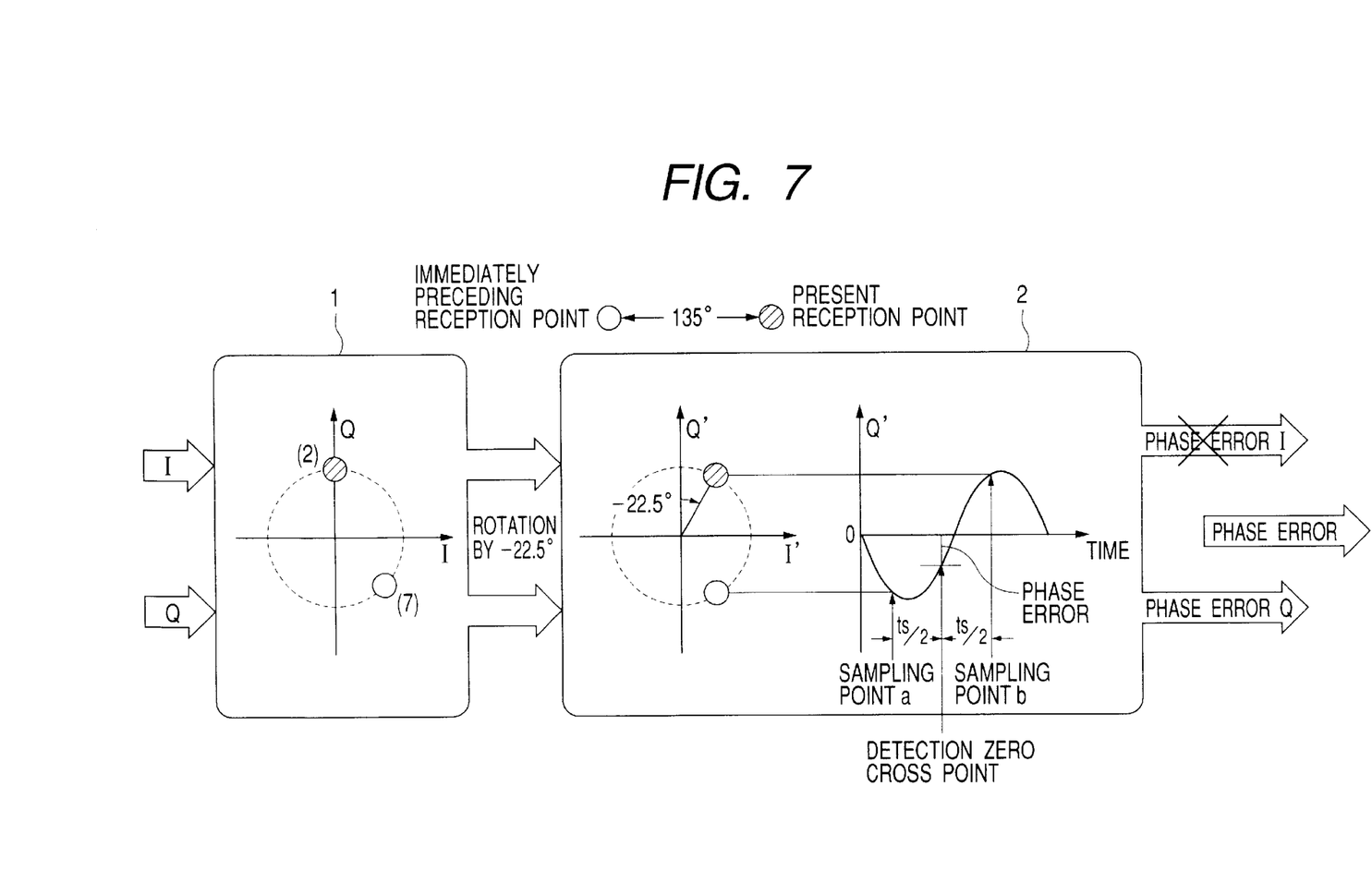
FIG. 7 is a schematic drawing for explaining the operation of the clock recovery circuit according to an embodiment of the present invention.

When mapping data of the PSK demodulated signal (I, Q) is (7) and (2) shown in FIG. 7, this is the case e, wherein the transition angle between reception points is 135° and the PSK demodulated signal (I', Q') phase-rotated by the phase rotation circuit 1 by −22.5° is supplied to the phase error detection circuit 2. The PSK demodulated signal (I', Q') is sampled by the DFF 21 at a sampling point a, the PSK demodulated signal (I', Q') is sampled by the DFF 23 at a sampling point b, and the PSK demodulated signal (I', Q') is sampled by the DFF 22 at a detection zero cross point.

A distance between the detection zero cross point and the I-axis or the Q-axis is detected by the phase error detector 24 as a phase error and the frequency of the master clock is controlled based on this phase error so that, in the case of FIG. 7, the detection zero cross point is moved toward the right to coincide with the zero cross point. It should be appreciated that, in this case, the phase rotation causes no eye aperture point of the PSK demodulated signal (I', Q') to be located on the I-axis or the Q-axis. It should be further appreciated that, in this case, since the reception points before and after the transition are in the same polarity direction with respect to the I'-axis, no phase error is detected, which is shown by the symbol x on the phase error I in the figure.

Figure 8:
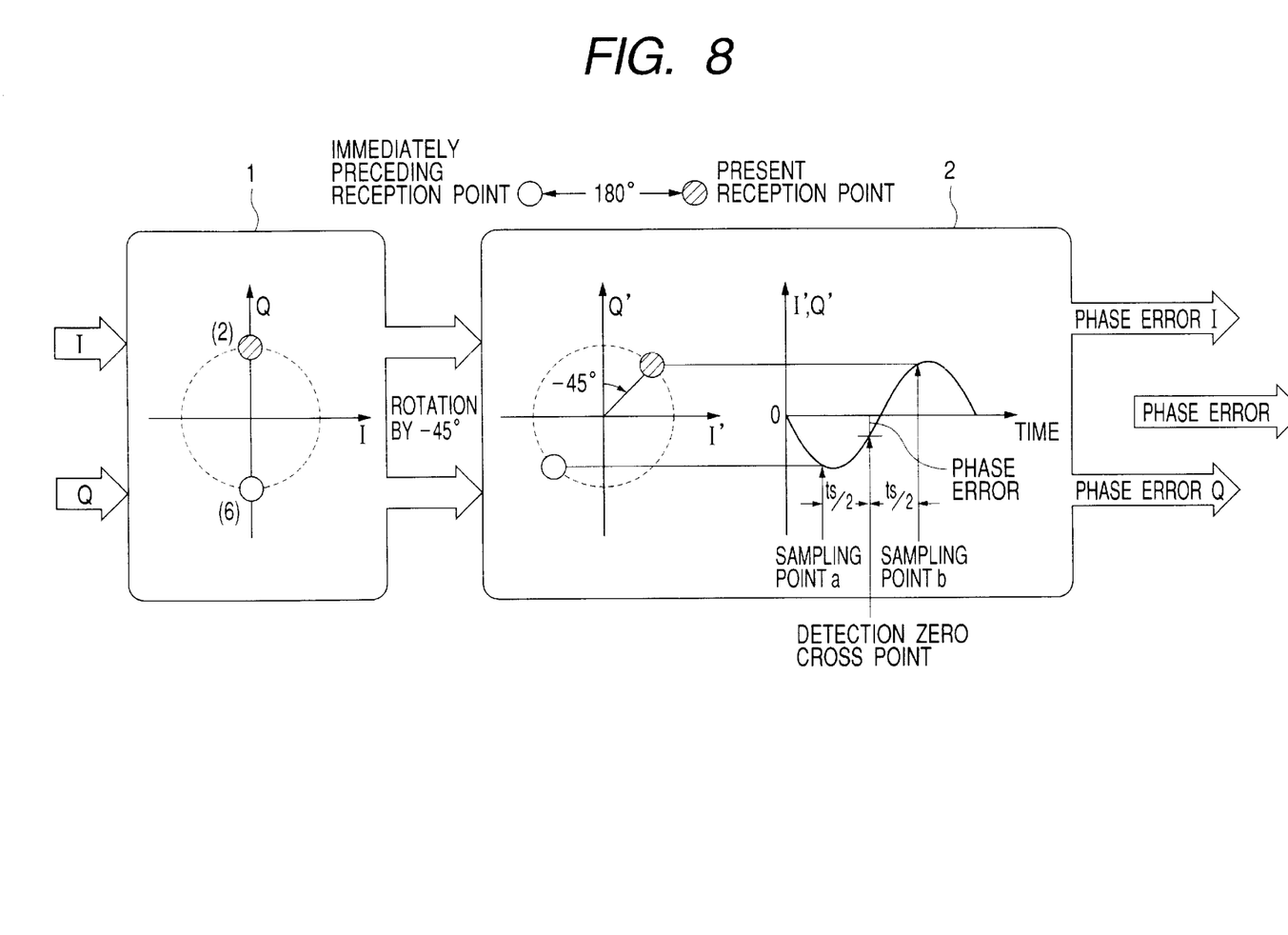
FIG. 8 is a schematic drawing for explaining the operation of the clock recovery circuit according to an embodiment of the present invention.

When mapping data of the PSK demodulated signal (I, Q) is (6) and (2) shown in FIG. 8, this is the case h, wherein the transition angle between reception points is 180° and the PSK demodulated signal (I', Q') phase-rotated by the phase rotation circuit 1 by −45° is supplied to the phase error detection circuit 2. The PSK demodulated signal (I', Q') is sampled by the DFF 21 at a sampling point a, the PSK demodulated signal (I', Q') is sampled by the DFF 23 at a sampling point b, and the PSK demodulated signal (I', Q') is sampled by the DFF 22 at a detection zero cross point.

A distance between the detection zero cross point and the I-axis or the Q-axis is detected by the phase error detector 24 as a phase error and the frequency of the master clock is controlled based on this phase error so that, in the case of FIG. 7, the detection zero cross point is moved toward the right to coincide with the zero cross point. It should be appreciated that, in this case, the phase rotation causes no eye aperture point of the PSK demodulated signal (I', Q') to be located on the I-axis or the Q-axis. It should be further appreciated that, in this case, since the reception points before and after the transition are in different polarity directions with respect to the I-axis, a phase error I for the I-axis is detected in a similar manner to the phase error Q. Then the average of the phase error Q and the phase error I is a phase error for this case.

When phase errors are detected for both the I-axis and the Q-axis, the average of both phase errors is used as a phase error for the case, resulting in better performance than when either one of the phase errors is used.

In the clock recovery circuit according to an embodiment of the present invention as described above, the master clock is obtained from the output of the phase error detection circuit 2 via the IIR filter 3, the D/A converter 4, and the temperature-compensating voltage-controlled crystal oscillator 5 and it should be appreciated, however, that the master clock can be obtained through a digital operation on the output of the phase error detection circuit 2 rather than such a conversion to an analog signal. It should be also appreciated that an eye aperture point which is an actual reception point can be estimated from the output of the phase error detection circuit 2.

It should be further appreciated that 8PSK demodulated signals are used in the above description but the present invention can be applicable to BPSK demodulated signals and QPSK demodulated signals. With BPSK demodulated signals, since only a phase difference of 180° occurs for a reception point, the object of the present invention may be achieved only by applying the cases g and h in FIG. 3 to those signals. On the contrary, with QPSK demodulated signals, since only a phase difference of 90 or 180° occurs for a reception point, the object of the present invention may be achieved only by applying the cases c, d, g, and h in FIG. 3 to those signals.

INDUSTRIAL APPLICABILITY

As described above, with the clock recovery circuit according to the present invention, a PSK demodulated signal is phase-rotated by the phase rotation circuit by an angle predetermined from a transition angle between adjoining reception points and a phase error due to a time difference between a zero cross point where the adjoining reception points of the phase-rotated PSK demodulated signal intersect the I-axis or the Q-axis and the midpoint in time for the adjoining reception points is detected, so that a sampling location for the adjoining reception points of the PSK demodulated signal is corrected based on the detected phase error in order to allow for sampling at an eye aperture point. Therefore, no zero cross point will be detected wrongly and a clock can be reproduced accurately.

In addition, with the clock recovery circuit according to the present invention, no reception point will coincide with the I-axis and the Q-axis and more zero cross points can be detected.

What is claimed is:

1. A clock recovery circuit, CHARACTERIZED BY phase rotation means for phase-rotating a PSK modulated signal by a predetermined angle depending on the transition angles of two adjoining reception points so that an in-phase component signal or a quadrature component signal of said phase-rotated PSK modulated signal intersects a zero level during a transition process of said two adjoining reception points;

phase error detection means for detecting a phase error due to a time difference between a zero cross point where an in-phase component signal or a quadrature component signal of said phase-rotated PSK modulated signal intersects the zero level and the midpoint in time for said adjoining reception points; and correction means for correcting a sampling location for the adjoining reception points of said PSK modulated signal on the basis of said detected phase error to allow sampling to be executed at an eye aperture point.

2. The clock recovery circuit according to claim 1, wherein said phase rotation means receives the PSK modulated signal and comprises a first phase rotator for phase-rotating a reception point by −45°, a first selector for selecting either one of the output of said first phase rotator and the received PSK modulated signal, a second phase rotator for phase-rotating the output of said first selector by −22.5°, and a second selector for selecting either one of the output of said second phase rotator and the output of said first selector, whereby the selection by said first and second selectors is performed on the basis of a transition angle between adjoining reception points.

3. The clock recovery circuit according to claim 1 or 2, further comprising means for obtaining a sampling clock used to sample an eye aperture point based on an output oscillation frequency from an oscillator whose oscillation frequency is controlled on the basis of a low frequency component of the phase error detected by said phase error detection means.

* * * * *